United States Patent [19]

Allo

[11] 4,296,612

[45] Oct. 27, 1981

[54] FREEZE EXCHANGER WITH REMOVABLE TUBE LINER

[75] Inventor: Vincent F. Allo, Warrenville, Ill.

[73] Assignee: Chicago Bridge & Iron Company, Oak Brook, Ill.

[21] Appl. No.: 160,667

[22] Filed: Jun. 18, 1980

[51] Int. Cl.³ .............................................. B01D 9/04
[52] U.S. Cl. ...................................... 62/123; 62/532; 165/141; 165/142
[58] Field of Search .................... 62/67, 123, 124, 317, 62/532; 165/141, 142

[56] References Cited

U.S. PATENT DOCUMENTS

| | | | |
|---|---|---|---|
| 2,718,279 | 9/1955 | Kraus | 62/532 |
| 3,603,103 | 9/1971 | Sheffield | 62/124 |

*Primary Examiner*—Ronald C. Capossela
*Attorney, Agent, or Firm*—Merriam, Marshall & Bicknell

[57] ABSTRACT

A freeze exchanger comprising at least one freeze tube secured in, and penetrating, first and second spaced-apart tube sheets; a cover beyond the first tube sheet; a shell around the tube sheets and connected thereto, with said cover supported by the shell; a removable tubular liner, in the freeze tube, of smaller outside diameter than the inside diameter of the freeze tube thereby defining an annulus between the two tubes; a conduit to deliver a liquid feed stream into a feed box space between the first tube sheet and the cover; and a conduit to deliver a cooling fluid around the freeze tube inside of the shell between the first and second tube sheets and a conduit to remove cooling fluid therefrom.

8 Claims, 4 Drawing Figures

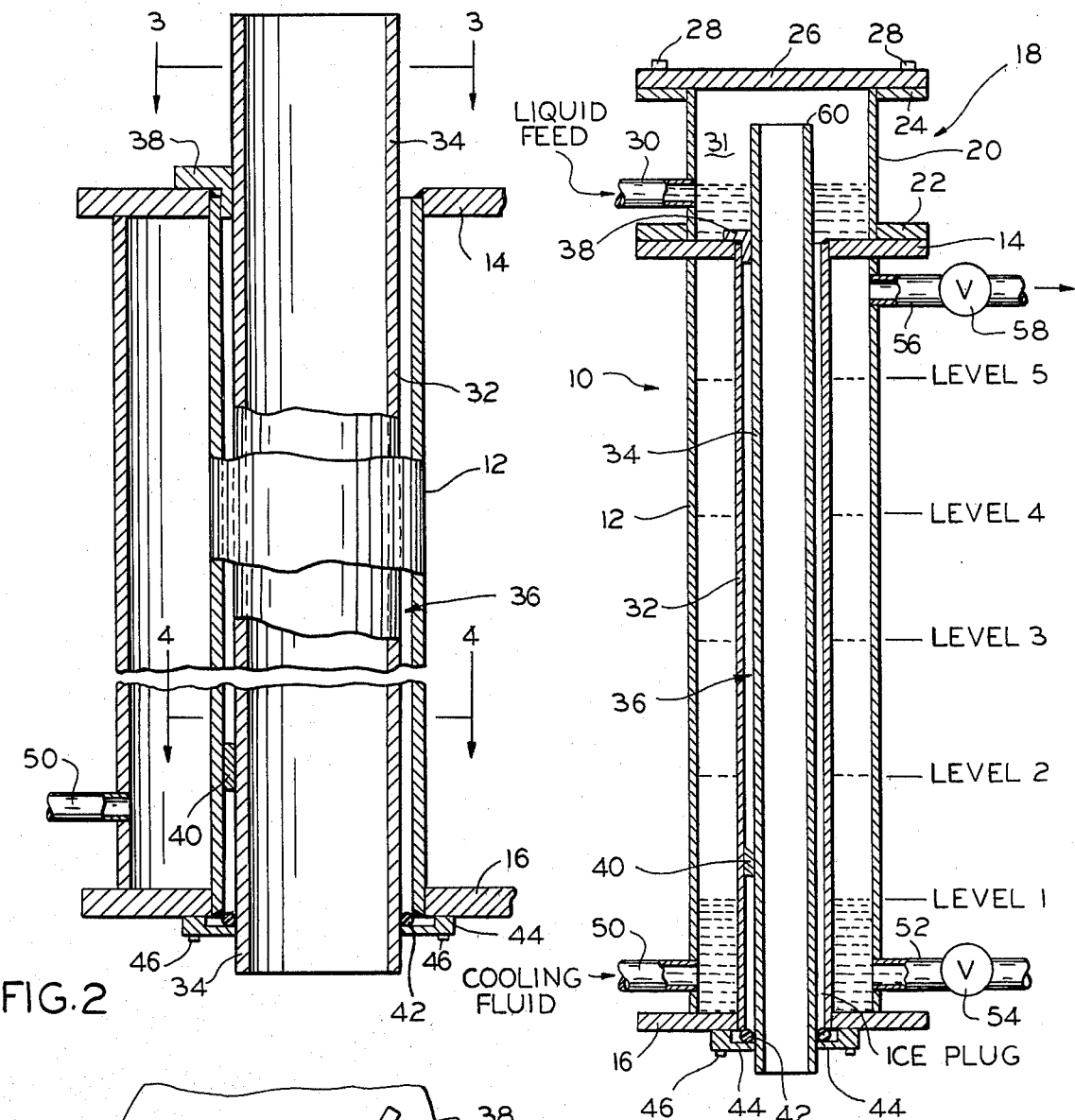

FREEZE EXCHANGER WITH REMOVABLE TUBE LINER

This invention relates to freeze exchanger apparatus for concentrating a liquid mixture containing dissolved or suspended solids by freezing-out part of the liquid carrier or solvent. More particularly, this invention is concerned with a freeze exchanger apparatus having a tube and surrounding shell with a removable liner in the tube defining an annulus between the liner and tube fillable with solidified liquid carrier or solvent to maintain efficient heat exchange.

BACKGROUND OF THE INVENTION

Various freeze processes have been developed to produce potable water from seawater or brackish water, to concentrate fruit juices such as orange juice and grape juice, vegetable juices such as tomato juice, coffee, and to separate dissolved or suspended salts from the liquid carrier. See, for example the United States patents of Ashley et al U.S. Pat. No. 3,070,969; Ashley U.S. Pat. No. 3,477,241; Ashley U.S. Pat. No. 3,501,924, Ganiaris U.S. Pat. No. 3,620,034, Johnson U.S. Pat. No. 3,664,145 and Ogman U.S. Pat. No. 4,091,635.

One of the major problems in freeze concentrating a liquid mixture has been the deposition of frozen solvent, usually ice, on the freeze exchanger surfaces. Build-up of ice lowers heat transfer and reduces the efficiency of the apparatus. In addition, if build-up of ice or some other frozen solvent continues it can plug up the apparatus completely making it necessary to shut it down to thaw out the frozen material.

One type of freeze exchanger recently developed employs a tube and shell arrangement. Cooling fluid flows around the tube while a film of liquid to be concentrated flows downwardly along the inside surface of the tube. By indirect heat exchange the liquid feed is cooled and crystals of the solvent or liquid carrier, often water, are formed. To prevent build-up of ice, the metal tube inside surface is highly polished by a electro-polishing or chemical polishing procedure. The protracted use of such equipment in concentrating liquid mixtures can be expected to result in degradation of the polished surface to such an extent that the tube needs replacement. This is a costly operation and involves considerable down-time for the freeze exchanger. A need accordingly exists for a freeze exchanger which can avoid such a problem by permitting ready replacement of the freeze exchanger liquid mixture contacting surface.

SUMMARY OF THE INVENTION

According to the invention, there is provided a freeze exchanger comprising at least one freeze tube secured in, and penetrating, first and second spaced apart tube sheets; a cover beyond the first tube sheet; a shell around the tube sheets and connected thereto, with said cover supported by the shell; a removable tubular liner, in the freeze tube, of smaller outside diameter than the inside diameter of the freeze tube thereby defining an annulus between the two tubes; means to deliver a liquid feed stream into a feed box space between the first tube sheet and the cover; and means to deliver a cooling fluid around the freeze tube inside of the shell between the first and second tube sheets and means to remove cooling fluid therefrom.

The liner can be made of metal, such as stainless steel, and have a highly polished internal surface. Alternatively, the liner can be made of a solid polymeric material such as polypropylene, nylon or polytetrafluoroethane (Teflon). In addition, the liner can be made of metal with an internal polymeric coating, such as a coating of polytetrafluoroethane.

The liner desirably is axially centered in the freeze tube by means of spacers. Also, both the liner and the freeze tube are generally circular in lateral section although they could have some other sectional shape provided the shape of each is the same.

Under some conditions it is advantageous to include a sealing means to seal the annulus near the second tube sheet.

Usually it is desirable for the liner to be longer than the freeze tube so that it can extend beyond the first tube sheet and beyond the adjacent end of the freeze tube. In addition, it is generally best to have the downstream end of the liner extend beyond the second tube sheet and beyond the downstream end of the freeze tube, and to also have the downstream end of the liner open to the environment outside of the freeze exchanger.

The freeze exchanger can have, of course, more than one freeze tube-liner combinations supported in the shell by the first and second tube sheets.

While the freeze exchanger is usually found most useful when vertically positioned, it is clear that it can be used horizontal or tilted at an angle between vertical and horizontal.

The freeze exchanger of the invention is highly useful for concentrating liquid mixtures in which water is the solvent or carrier. However, liquid mixtures in which an organic solvent is the liquid carrier can also be concentrated using the apparatus if the organic solvent freezes or solidifies from the mixture and the solidified solvent can be separated, such as by gravity separation or cold filtration.

The cooling fluid may be a refrigerant gas such as ammonia, or a Freon brand gas such as dichlorotetrafluoroethane, or it may be a cooled liquid such as propylene glycol or ethanol.

Not only does use of a liner permit ready replacement of the contact surface but, in addition, it makes possible construction of a freeze exchanger with less expensive materials. For example, the freeze tube can be made of carbon steel instead of stainless steel. In addition, it is unnecessary to polish the tube inside surface after installation in the tube sheets.

It may be desirable, at times, to include metal flakes, shot or powder in the annulus with the liquid media to increase heat transfer properties across the annulus.

BRIEF DESCRIPTION OF THE DRAWINGS

FIG. 1 is a vertical sectional view of a freeze exchanger having a removable tubular liner in the freeze tube;

FIG. 2 is an enlarged view of a portion of the freeze exchanger illustrated in FIG. 1;

FIG. 3 is a sectional view taken along the line 3—3 of FIG. 2; and

FIG. 4 is a sectional view taken along the line 4—4 of FIG. 2.

DETAILED DESCRIPTION OF THE DRAWINGS

So far as it is practical and convenient the same or similar elements in the various views of the drawings will be identified by the same numbers.

With reference to FIGS. 1 and 2, the freeze exchanger 10 has a metal shell 12, a first tube sheet 14 and a lower tube sheet 16. Included as part of the shell 12 is a removable inlet head 18 comprising a tubular portion 20, a lower flange 22 and an upper flange 24. Removable cover 26, which can be transparent, is secured to flange 24 by bolts 28. Conduit 30 communicates with the feed box space 31 defined by inlet head 18 and the first tube sheet 14.

One end of freeze tube 32 enters a hole in, and is secured to, the first tube sheet 14. Similarly, the other end of freeze tube 32 enters a hole in, and is secured to, the second tube sheet 16.

Removable tubular liner 34 is positioned inside of freeze tube 32. The outside diameter of liner 34 is somewhat less than the inside diameter of freeze tube 32, thereby providing an annulus 36 between them. Support spacers 38 are attached near the upper end of liner 34 to space it axially inside of freeze tube 32 and, by resting on the first tube sheet 14, prevent the liner from falling out. Spacers 40 are also positioned on the outside of liner 34 near its lower end to help maintain axial arrangement between the liner 34 and the freeze tube 32.

An O-ring elastomeric seal 42 is placed at the lower end of annulus 36 and it is secured in place by retainer ring 44 removably joined to the second tube sheet 16 by bolts 46.

Conduit 50 communicates with the lower internal space inside of shell 12 and is used to supply a cooling fluid to the freeze exchanger. Conduit 52 containing valve 54 also communicates with the lower internal space of shell 12. In addition, conduit 56 containing valve 58 communicates with the upper internal space inside of shell 12 and is used to withdraw cooling fluid from the freeze exchanger during use of the apparatus to concentrate a liquid feed mixture.

Before putting the freeze exchanger disclosed in the drawings into operation, it is important that the annulus be filled with a suitable material which will permit efficient heat exchange between a liquid mixture in the liner 34 and a cooling liquid in shell 12 and around freeze tube 32. Most suitably, the annulus is filled with a frozen volume of the liquid feed mixture to be concentrated. Filling the annulus with a material having the same, or close to the same, composition as the material to be concentrated is desirable since it avoids introduction of some other substance which might adversely affect the feed liquid or contaminate it. Since many liquid feed mixtures have water as the solvent or carrier liquid, it is often satisfactory in many instances to fill the annulus 36 with ice.

Annulus 36 can be readily filled with ice by introducing water, by means of conduit 30, to completely fill the annulus. After water fills the annulus, cooling fluid is introduced into the shell through conduit 50 to level 1. The cooling fluid level in the shell is controlled by means of conduit 52 and valve 54. The water in annulus 36 freezes to level 1. Then the cooling fluid level is raised to level 2 to freeze the water in the annulus up that level. After that, the cooling fluid level is raised to level 3 to form ice in the annulus to that level. The operation is then continued in stages until the annulus is totally filled with ice. By freezing the annulus in stages excess pressure build-up against the liner and the freeze tube is avoided, thus permitting use of a very thin liner.

In freezing the annulus it may be unnecessary to use O-ring 42 or retainer ring 44 since ice build-up at the lower end of the annulus will take place during flow of water out its end. The ice build-up will continue until the annulus end is completely plugged.

Once the annulus is filled with ice, valve 54 is closed so that all cooling fluid must exit through conduit 56 and through open valve 58. The rate of liquid fed to feed box 31 is then adjusted, if necessary, so that the liquid level rises to the top 60 of the liner 34. The liquid then flows downwardly as a falling film on the inside surface of liner 34. As it flows downwardly, the liquid is cooled and ice crystals form. The liquid mixture containing ice crystals flows out of the lower end 62 of liner 34 into a receptacle, not shown, in which the floating ice is separated by gravity from the liquid. If desired or necessary, liquid can be withdrawn from the receptacle and returned to feed box 31 for another passage through liner 34 to freeze out more ice.

The liner 34 is readily replaced by taking the freeze exchanger out of service, melting the frozen media in the annulus 36, removing cover 26, withdrawing the liner 34 and inserting a new liner. The annulus can then be filled with frozen liquid as described herein.

Instead of using water in the annulus, it can be filled with any other liquid mixture being concentrated, including seawater, brackish water, fruit juice, vegetable juice and coffee.

The foregoing detailed description has been given for clearness of understanding only, and no unnecessary limitations should be understood therefrom, as modifications will be obvious to those skilled in the art.

What is claimed is:

1. A freeze exchanger comprising:
   at least one freeze tube secured in, and penetrating, first and second spaced-apart tube sheets;
   a cover beyond the first tube sheet;
   a shell around the tube sheets and connected thereto, with said cover supported by the shell;
   a removable tubular liner, in the freeze tube, of smaller outside diameter than the inside diameter of the freeze tube thereby defining an annulus between the two tubes;
   means to deliver a liquid feed stream into a feed box space between the first tube sheet and the cover; and
   means to deliver a cooling fluid around the freeze tube inside of the shell between the first and second tube sheets and means to remove cooling fluid therefrom.

2. A freeze exchanger according to claim 1 including spacers centering the liner in the freeze tube.

3. A freeze exchanger according to claim 1 including sealing means to seal the annulus near the second tube sheet.

4. A freeze exchanger according to claim 1 in which the liner is longer than the freeze tube and extends beyond the first tube sheet.

5. A freeze exchanger according to claim 1 in which the liner end near the second tube sheet is open to the environment outside of the freeze exchanger.

6. A freeze exchanger according to claim 1 in which the liner is metal and it has a polished internal surface.

7. A freeze exchanger according to claim 1 in which the liner comprises a solid polymeric material.

8. A freeze exchanger according to claim 1 in which the liner is metal coated inside with a solid polymeric material.

* * * * *